F. A. JONES.
HORSE STARTING DEVICE.
APPLICATION FILED NOV. 12, 1914.
1,147,405.
Patented July 20, 1915.
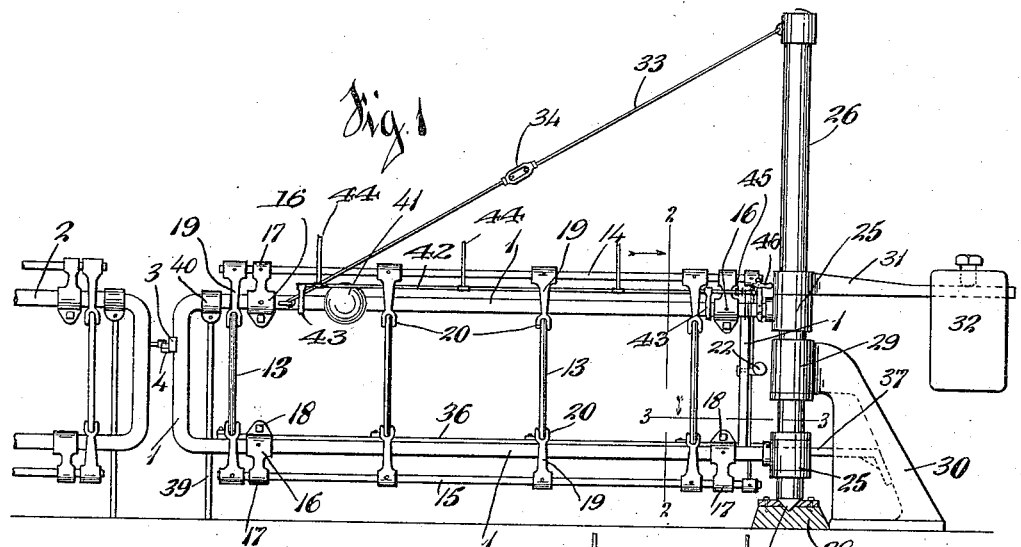

UNITED STATES PATENT OFFICE.

FRANK A. JONES, OF NEWPORT, KENTUCKY, ASSIGNOR TO THE KENTUCKY STARTING GATE COMPANY, OF NEWPORT, KENTUCKY, A CORPORATION OF KENTUCKY.

HORSE-STARTING DEVICE.

1,147,405.  Specification of Letters Patent.  Patented July 20, 1915.

Application filed November 12, 1914. Serial No. 871,823.

*To all whom it may concern:*

Be it known that I, FRANK A. JONES, a citizen of the United States, and a resident of the city of Newport, in the county of Campbell and State of Kentucky, have invented certain new and useful Improvements in Horse-Starting Devices, of which the following is a full, clear, and exact description, reference being had to the accompanying drawings, forming part of this specification.

The essential features of a horse starting device are a common barrier and a set of stalls. In some instances the stalls are pivotally mounted so as to lie flush with the barrier when not in use, and in these it has been found difficult to brace the stall members sufficiently when open.

It is the object of my invention to provide a starting device, preferably of the gate form with pivoted stall members and to provide simple but highly efficient means of bracing the stall members in open position.

It is a further object of my invention to provide an automatic mechanism for swinging the stall members flush with the barrier, when the barrier is swung open, or away from the track.

These objects and others as will be pointed out later, I accomplish by that certain construction and arrangement of parts to be hereinafter specifically pointed out and claimed.

In the drawings, Figure 1 is a front elevation of the device. Fig. 2 is a vertical section thereof, taken on the line 2, 2, of Fig. 1, with the pivot post omitted. Fig. 3 is a horizontal section on the line 3, 3, of Fig. 1, showing open and closed positions of the gate. Fig. 4 is a perspective view of the locking member on one gate. Fig. 5 is a sectional detail showing the vertically moving bolt on the opposite gate, whereby the two gates are held together when opened. Fig. 6 is a detail vertical section showing the swiveled mounting for one of the pivoted stall members. Fig. 7 is a side view of a portion of the slap stick device.

It is designed, preferably, to employ two gates, with rectangular frames 1 and 2 respectively. The gates are to be located on opposite sides of a race track, and when swung out are provided with a spring latch to lock them together as follows: The frame 1 has mounted on it a plate 3, having a grooved extension 4 to form a seat (Fig. 4). The frame 2 (Fig. 5) is recessed at 5 to form a socket, and a spring in the socket presses down on a plunger 6, that has a right angled extension 7, sliding in the slot 8 in the frame. This extension has the roller tip 9, which is of a size to seat in the groove, thereby holding the two gates together. Otherwise the structure of the two gates is the same and the description of one will suffice for both. It is readily appreciated that to lock the gates they are swung out, when the spring bolt will snap into its seat to be retained there by the spring, until manually released.

Mounted in properly located holes in the upper and lower members of the frame 1, are rocker pins 10, 10, (Fig. 6), held in place by nuts 11, 11, screwthreaded onto their free ends. On the other ends of the pins are mounting blocks 12, 12, for the stall members 13, 13. These stall members are in the shape of small gates, between which the horses are backed up when they are to be started, and are mounted so as to swing with relation to the frame both at the top and bottom as above described.

To lock and brace the stall members open, that is to say, in a position at right angles to the gate frame, upper and lower braces and locks are provided. These devices comprise rock shafts 14, 15, mounted on the gate frame by arms 16, 16. These arms have journals 17 for the shafts and clamp ends 18 for the upper and lower frame members.

On the rock shafts are rigidly mounted the brace arms 19, which have grooved ends 20 to fit down over the stall members. When the top shaft is rocked in one direction and the lower shaft rocked in the other direction, the brace arms will swing down and up respectively so as to engage and lock the stall members in open position at right angles to the frame. To rock these shafts, a lever 21 (Fig. 2) is provided, pivotally mounted at 22 to the inner end frame piece, preferably by means of rocker pins as described for mounting the stall members, and this lever at one side of its fulcrum has pivotal connection with a compound lever 23 for the top rocker bar, and at the other with a compound lever 24 for the lower rocker bar. The levers are rigidly mounted on their respective bars, so as to rock them when the operating lever is pulled, as is obvious.

The gate itself is mounted by means of collars 25, 25, to a pivot post 26 of large dimensions. This post has a metallic pointed tip 27, which finds its seat in the pivot block 28. The post is held up by a journal 29 with roller bearing contact (not shown), and this journal is mounted on a heavy standard 30. The journal 29 is located between the collars 25, 25 and projecting rearwardly from the post is an arm 31, supporting a heavy counterbalancing weight 32, to equalize the weight of the gate on the opposite side of the post. A cable 33, with turn buckle 34 is strung from the top of the post to the outer end of the gate, as an additional security.

It has been described how the stall members are pivotally mounted with regard to the gate framework. It is desired to have these stall members alike connected to a movable bar parallel to the frame, so that they may be closed when the gate is swung away from the track, and opened when it is swung out across the track. With this in view, the lower bars of the stall members are extended through their rocker pin mounting and their ends secured at like angles to arms 35. These arms 35 are fixedly secured to the parallel bar 36 (Fig. 3) which extends the length of the gate.

At the inner end of the bar a depending pin 36ᵃ is secured, and the plate 37 is mounted on the standard 30, and provided with a cam slot 38 to engage the pin. This slot is at an angle to the line of the gate when open, and so arranged that as the gate is closed, it will permit the pin 36ᵃ to slide along just enough to preserve the parallel relation of the bar and frame. At the same time, of course, the bar will be drawn toward the inner end of the gate, thereby swinging the stall members into closed position, as shown in dotted lines in Fig. 2.

To hold the outer end of the gate firmly in place, against back pressure when in use, a leg 39 is provided, pivotally mounted on a revoluble collar 40, secured around the upper member of the frame. The leg will be, of course, longer than the distance to the ground from the collar 40, and it must be swung out of the way when it is desired to move the gate.

A bell or a series of bells, or sounding devices 41 is mounted on each gate member, said bells or sounders being very noisy so as to cause every horse in the stall members to break immediately from the barrier, when they are caused to sound by any desired means (not shown), such as closing an ordinary dry battery circuit. For further insuring that the horses break away simultaneously from the barrier, a slap stick device is established for each stall member. For this purpose, a rock shaft 42 is mounted revolubly in brackets 43 on the top frame member of the gate, and on the shaft are mounted the slap sticks 44. The shaft has a coiled spring 45 on its inner end, secured at one end to the frame. A releasable latch 46 of any desired character can be used to hold the shaft 42 against spring tension, and at the signal, to release the shaft, allowing it to rock under the pull of the spring and bring the slap stick smartly against the rumps of the horses.

Having thus described my invention, what I claim as new and desire to secure by Letters Patent, is:—

1. In a race horse starting device, a swinging gate member, stall members pivoted to the gate member, and automatic means for swinging the stall member flush with the gate member upon swinging open the gate member.

2. In a race horse starting device, a swinging gate member, stall members pivoted to the gate member, and automatic means for swinging the stall member flush with the gate member upon swinging open the gate member, and means for bracing the stall members when in open position.

3. In a race horse starting device, a swinging gate member, stall members pivoted to the gate member, and automatic means for swinging the stall members flush with the gate member upon swinging open the gate member, and means for engaging the stall members at the top and bottom to brace them when in open position.

4. In a race horse starting device, a swinging gate member, stall members pivoted to the gate member, and automatic means for swinging the stall members flush with the gate member upon swinging open the gate member, and means for simultaneously engaging the stall members at the top and bottom to brace them when in open position.

5. In a race horse starting device, a gate member, stall members having a frame, pivoted to the gate member, and means for engaging over the frame of the stall members at the top and bottom, to brace them when in open position.

6. In a race horse starting device, a barrier member, stall members mounted thereon, a spring actuated rock shaft on the barrier member, slap sticks for each stall on the shaft, and means for releasing the shaft to swing the slap sticks against the horses in the stalls to cause them to break from the barrier.

7. In a race horse starting device, a barrier member, stall members mounted thereon, a spring actuated rock shaft on the barrier member, slap sticks for each stall mounted in the same radial plane on the shaft, and means for releasing the shaft to swing the slap sticks against the horses in the stalls to cause them to break from the barrier.

8. In a race horse starting device, a swinging gate member, stall members pivoted to the gate member, a bar connected to all of the stall members, and means for actuating the bar to swing the stall members against the gate member, when the gate member is swung open.

9. In a race horse starting device, a gate member, stall members pivoted to the gate member, a bar connected to all of the stall members, and a cam for retaining one end of the bar for actuating the bar to swing the stall members against the gate member, when the gate member is swung open.

10. In a race horse starting device, a gate member, stall members pivoted to the gate member, bars pivotally mounted above and below the gate member, and brace arms on the bars to engage the stall members, to hold them in open position.

11. In a race horse starting device, a gate member, stall members pivoted to the gate member, bars pivotally mounted above and below the gate member, brace arms on the bars to engage the stall members, to hold them in open position, and means for rocking the bars simultaneously to operate the brace arms.

FRANK A. JONES.

Witnesses:
OLIVER W. SHERMAN,
KATHERINE SMITH.

Copies of this patent may be obtained for five cents each, by addressing the "Commissioner of Patents, Washington, D. C."